United States Patent
Huang et al.

(10) Patent No.: US 10,967,308 B2
(45) Date of Patent: Apr. 6, 2021

(54) MODULAR BACKWASH ASSEMBLY AND METHOD FOR USING THE SAME

(71) Applicants: Nanjing University, Nanjing (CN); Yixing Environmental Protection Research Institute of Nanjing University, Yixing (CN)

(72) Inventors: Hui Huang, Nanjing (CN); Hongqiang Ren, Nanjing (CN); Xuxiang Zhang, Nanjing (CN); Jinju Geng, Nanjing (CN); Qing Wang, Nanjing (CN)

(*) Notice: Subject to any disclaimer, the term of this patent is extended or adjusted under 35 U.S.C. 154(b) by 122 days.

(21) Appl. No.: 15/989,193

(22) Filed: May 25, 2018

(65) Prior Publication Data

US 2019/0151779 A1    May 23, 2019

(30) Foreign Application Priority Data

Nov. 22, 2017    (CN) .......................... 201711170138.6

(51) Int. Cl.

| | |
|---|---|
| *B01D 29/66* | (2006.01) |
| *B01D 21/28* | (2006.01) |
| *B01D 29/50* | (2006.01) |
| *C02F 1/00* | (2006.01) |
| *C02F 1/28* | (2006.01) |
| *C02F 1/36* | (2006.01) |
| *C02F 101/20* | (2006.01) |

(52) U.S. Cl.
CPC ......... *B01D 29/661* (2013.01); *B01D 21/283* (2013.01); *C02F 1/001* (2013.01); *B01D 2201/087* (2013.01); *C02F 1/281* (2013.01); *C02F 1/288* (2013.01); *C02F 1/36* (2013.01); *C02F 2101/20* (2013.01); *C02F 2201/007* (2013.01); *C02F 2303/16* (2013.01)

(58) Field of Classification Search
CPC ................ B01D 29/661; B01D 21/283; B01D 2201/087; B01D 29/50; B01D 29/66; B01D 29/72; C02F 1/001; C02F 2101/20; C02F 1/281; C02F 2201/007; C02F 1/288; C02F 2303/16; C02F 1/36; C02F 2209/16; C02F 2209/10; C02F 2201/004; C02F 2201/002; C02F 2303/14
See application file for complete search history.

(56) References Cited

FOREIGN PATENT DOCUMENTS

CN          203582583 U  *  5/2014

* cited by examiner

*Primary Examiner* — Waqaas Ali
(74) *Attorney, Agent, or Firm* — W&K IP

(57) ABSTRACT

A modular backwash assembly and method for using the same is disclosed, the modular backwash assembly comprises a filter brick body, an ultrasonic generator and an ultrasonic connecting component, the filter brick body is provided at an upper portion with a square trench and a cover, the square trench is provided with a plurality of stiffeners and fillers, and a conductive channel is provided on the periphery of the square trench and is provided with an ultrasonic conductive medium therein. The invention has the advantages of firm structure and durable, the gas distribution uniformity may be increased up to 96% and the turbidity average is below the specification 10 NTU.

4 Claims, 14 Drawing Sheets

MODULAR BACKWASH ASSEMBLY AND METHOD FOR USING THE SAME

CROSS-REFERENCE TO RELATED APPLICATIONS

This application claims priority to Chinese Patent Application No. 201711170138.6 with a filing date of Nov. 22, 2017. The content of the aforementioned applications, including any intervening amendments thereto, are incorporated herein by reference.

TECHNICAL FIELD

The present invention relates to the technical field of water treatment technique, in particular to a modular backwash assembly and a method for using the same.

BACKGROUND OF THE PRESENT INVENTION

In the actual project for water treatment, the filter layer needs to be periodically backwashed after a filter pool is used for a period of time. The main purpose is to remove the impurities and contaminants in the filter layer so as to regenerate the filter layer. In addition, the backwash operation can also reduce the resistance of filtration operation during water treatment. In general, backwash is suitably conducted by the air-water joint backwash, which is sequentially air washing, air and water joint washing, and water washing. Air washing time is suitably 3-5 min; air-water joint washing time is suitably 10-15 min; and separate water washing time is suitably 5-10 min. The intensity for air washing is suitably 90-110 m3/(m2·h); and the intensity for water washing is suitably 14-16 m3/(m2·h). Accordingly, a backwash assembly with the function of high-efficient air-water distribution plays a crucial role in the backwash effect.

Currently, long-handled filter heads and filter bricks are essentially adopted in project as the core assembly for filter pool backwash. In practical application, the long-handled filter heads essentially have such problems as large area of dead zone for air-water distribution, short service life and difficulty of routine maintenance. Compared to the long-handled filter heads, the other assembly filter brick has the advantages of high uniformity of air-water distribution, long service life and low cost, however, it is inadequate in the overall structural stability of the filter brick and its performance of air-water distribution.

SUMMARY OF PRESENT INVENTION

In view of the above technical problems, the present invention provides a modular backwash assembly and a method for using the same. It can be used for overcoming the problems of low efficiency of filter material washing due to poor uniformity of air-water distribution in the existing filter brick and the existing situation of high energy consumption of the backwash system due to the insufficient structural design of the filter brick.

The technical solution of the present invention is: a modular backwash assembly essentially comprising a filter brick body of cuboid structure, the filter brick body is provided with a square trench at the center of the upper portion having a number of stiffeners and fillers therein which enable a more stable structure of the filter brick body. A mating cover is provided over the square trench, the lower portion of the filter brick body is provided with an inner cavity and brick legs, the brick legs are designed perpendicular to ground, so that the uniformity of air-water distribution is higher than that of the conventional filter brick, the inner cavity penetrates through the whole filter brick body from left to right, the brick legs are respectively arranged at an equal interval under the long side of the filter brick body, a flow control gap is provided between two adjacent brick legs, the flow control gap is designed to be a combination of semicircle and rectangle to further improve the uniformity of air-water distribution, the width of the brick legs is equal to that of the flow control gap to facilitate, that the flow control gap of the filter brick body can be aligned during interlacing connection to ensure that the fluid flushing speed is uniformly distributed. positioning blocks are arranged above the flow control gap, and a first and a second slot is respectively arranged above the brick legs at both ends, and the opposite sides of the first slot and the second slot are respectively provided with a first chuck and a second chuck, the first slot and the first chuck, the second slot and the second chuck are configured to connect the longitudinally adjacent filter brick bodies. One short side of the filter brick body is provided with a male fastener, and the other side of the short side is provided with a corresponding female fastener, the male fastener and the female fastener are configured to connect the transversely adjacent filter brick bodies.

A modular backwash assembly, essentially comprising: a filter brick body of a cuboid structure, an ultrasonic generator and an ultrasonic connecting component, the filter brick body is provided at the center of an upper portion with a square trench and the square trench is provided with a plurality of stiffeners and fillers to make the structure of the filter brick body more stable. a mating cover is provided over the square trench, a conductive channel is provided on the periphery of the square trench and is "U-like" shaped, the conductive channel is built in the upper portion of the filter brick body and is provided with an ultrasonic conductive medium therein. The natural frequency of the ultrasonic conductive medium is similar to that of the water. When the ultrasonic generator is connected by the ultrasonic connecting component, an ultrasonic wave with a natural frequency close to that of the ultrasonic conductive medium is emitted, so as to make the ultrasonic conductive medium resonate in each filter brick body which in turn renders the resonance of surrounding water to achieve the effect of cleaning the filter bed by ultrasonic vibration. A lower portion of the filter brick body is provided with an inner cavity and brick legs, and the brick legs are designed, to be perpendicular to ground so that the uniformity of the air-water distribution is higher than that of the conventional filter brick. The inner cavity penetrates through the filter brick body from left to right, and the brick legs are respectively disposed at an equal interval under the long side of the filter brick body. A flow control gap is provided between adjacent brick legs, which applies a combined design of a semicircle and a rectangle shape, thereby further improving the uniformity of air-water distribution, the brick legs and the flow control gap have same width to facilitate the alignment of the flow control gap of each filter brick body during alternating connection, so as to ensure that the flushing speed of the fluid is evenly distributed. A positioning block is provided above the flow control gap, brick legs at two ends are provided with a first slot and a second slot respectively, and a corresponding first chuck and a second chuck are respectively provided at the opposite sides of the first slot and the second slots, the first slot and the first chuck, and the second slot and the second chuck are configured to connect the longitudinally adjacent filter brick bodies respectively. The first chuck and the second chuck are respectively provided with a first infusion channel and a second infusion channel. One end of the first infusion channel and the second infusion channel are respectively communicated with the conductive channel, and the other end penetrates the first chuck and the second chuck respectively, and is sealed by the blocker. One short side of the brick body is provided with a male fastener and the other short side is provided with a corresponding female fastener, the male fastener and the female fastener are configured to connect the transversely adjacent filter brick bodies, the ultrasonic connecting component comprises a piercing probe and a sealing sleeve, the distal end of the piercing probe is located in the first infusion channel or the second infusion channel and is in contact with the ultrasonic conductive medium, the proximal end of the piercing probe is connected with the ultrasonic generator through a waterproof wire, the sealing sleeve is wrapped around the first chuck or the second chuck.

Further, the stiffeners are transversely connected at an equal interval between two long sides of the square trench or spirally connected inside the square trench, the spiral stiffener has strong impact resistance and higher stability.

Further, the fillers is concrete or an adsorbent counterweight package, the cover is a solid cover when the fillers is concrete, and the cover is a hollow cover when the fillers is an adsorbent counterweight package, and the components of the adsorbent counterweight package comprise by weight 40% red mud-based porous ceramics, 30% glass beads, 30% sponge iron and the red mud-based porous ceramics can be used for adsorbing heavy metal ions, and the weight of the three kinds of fillers are relatively heavy which can further serve as a counterweight material to stabilize the structure of the filter brick body.

Further, the ultrasonic conductive medium is in the form of gel, with natural frequency of 26-28 MHZ, the filling rate of the ultrasonic conductive medium in the conductive channel is 50-75%, and the overfilling may result in the vibration amplitude being too large during resonance process, thus making the filter brick body vibrate with an over large amplitude, which is adverse to the stability of the brick body.

Further, the components of the ultrasonic conductive medium comprise by weight: 15-23% nanosilica sol, 15-20% nanocellulose gel, 5-15% polyacrylamide gel, 3-7% sodium alginate gel, 4-6% agarose gel, 2-5% propylene dextran gel, 0.05-0.3% pH adjusting agent, 0.1-1% moisturizer, 0.01-0.2% bactericidal preservative, with the balance being deionized water. The gel-type conductive medium has high sound transmission efficiency and is more stable.

Further, the ultrasonic generator is connected to any one of the filter bricks, the ultrasonic frequency of the ultrasonic generator is 26-28 MHz, the single occurrence time is 30-180 seconds, the time interval is 3-5 minutes, and the ultrasonic waves are pulsed at intervals, to prevent a long series of ultrasonic resonance caused by the occurrence of ultrasonic wave in long time which resulting in exceeding the estimated destruction.

Further, the connection mode of the filter brick body is parallel and interlacing type, and the parallel type is that the first chuck and the second chuck of the filter brick body in an odd number of transverse rows respectively connect in a corresponding manner to the first slot and the second slot of the filter brick body in an even number of transverse rows adjacent thereto; the interlacing type is that the first chuck and the second chuck of the filter brick body in an odd number of transverse rows respectively connect in a alternating manner to the second slot and the first slot of the filter brick body in an even number of transverse rows adjacent thereto. The parallel type connection can make rational use of the filter pool area while the interlacing type connection makes the connection of the filter brick body more compact, especially under ultrasonic resonance, such that the overall stability is higher.

Further, the male fastener comprises a first positive round tenon and a first negative round groove, the female fastener comprises a second positive round tenon and a second negative round groove, the first positive round tenon and the second positive round tenon are respectively provided with an expansion slit which can preserve space to protect the male and female fastener from being damaged as they were squeezed during vibration, the first positive round tenon and the second negative round groove, the first negative round groove and the second positive round tenon match each other respectively.

Through the male fastener and the female fastener, the stability of the two connected filter bricks are reinforced, which however to a certain extent also increases the gap between the filter bricks and, to a certain extent, causes some of the water and air when backwash flowing away from the gap, which may affect the uniformity of air-water distribution. As an improvement, grooves are respectively arranged at the left and right ends of the upper surface of the filter brick body, the grooves are respectively parallel to the male fastener and the female fastener and the two transversely adjacent grooves are connected through a cover plate, the length of the cover plate is equal to the width of the filter brick body, and the cover plate is also provided with circular holes arranged in a matrix. In this way, not only increases the stability between the filter brick body, but also makes up for the deficiency cause by the increased gap, reduces the air and water resistance, is more beneficial to the air-water distribution.

A method for using a modular backwash assembly includes the following steps:

(1) Obtaining the following parameters according to the wastewater treatment scale, influent quality requirements and effluent discharge standards:

Q: Amount of water to be treated (m3/d) A: influent TN (mg/L), B: influent TP (mg/L), S: influent SS (mg/L), A1: effluent TN (mg/L), B1: effluent TP (mg/L), S1: effluent SS (mg/L), size of filter brick L (length)×W (width)

(2) Modularizing the block number of the filter brick body by the calculating formula:

$$N = \frac{[(A - A_1) + 0.01(S - S_1)] \times Q}{1098 \times (L \times W)}$$

$$N = Z, N = Z(Z = 1, 2, 3 \ldots )$$

$$N \neq Z, N = \text{INT}(N) + 1$$

(3) Calculating the block number N of the modularized filter brick body according to step (1) and step (2);

(4) Filling the square trench of the N filter brick bodies with the fillers and capping the cover, and then transversely connecting the male fastener and the female fastener to obtain transversal filter bricks, connecting the transversal filter bricks through the parallel or interlacing connection, until the bottom of the filter pool is fully covered;

(5) Conducting air distribution uniformity test to check the effect of the air-water distribution of the filter brick and its tightness.

Another method for using the modular backwash assembly includes the following steps:

(1) Obtaining the following parameters according to the wastewater treatment scale, influent quality requirements and effluent discharge standards:

Q: Amount of water to be treated (m3/d) A: influent TN (mg/L), B: influent TP (mg/L), S: influent SS (mg/L), A1: effluent TN (mg/L), B1: effluent TP (mg/L), S1: effluent SS (mg/L), size of filter brick L (length)×W (width)

(2) Modularizing the block number of the filter brick body by the calculating formula:

$$N = \frac{[(A - A_1) + 0.01(S - S_1)] \times Q}{1098 \times (L \times W)}$$

$$N = Z, N = Z(Z = 1, 2, 3 \ldots )$$

$$N \neq Z, N = \text{INT}(N) + 1$$

(3) Calculating the block number N of the modularized filter brick body according to step (1) and step (2);

(4) Filling the square trench of the N filter brick bodies with the fillers and capping the cover meanwhile injecting 50%-75% of the ultrasonic conductive medium into the conductive channel through the first infusion channel or the second infusion channel by using a syringe, and blocking the same by using an blocker, transversely connecting the male fastener and the female fastener to obtain transversal filter bricks, connecting the transversal filter bricks through the parallel or interlacing connection, until the bottom of the filter pool is fully covered, and connecting the ultrasonic generator through the ultrasonic connecting component on the exposed first chuck or the second chuck;

(5) Conducting air distribution uniformity test to check the effect of the air-water distribution of the filter brick and its tightness.

Compared with the prior art, the beneficial effects of the present invention are as follows:

(1) The modular backwash assembly filter brick of the present invention has its flow control gap innovatively applied a combination of semi-circular and rectangular design, a design of 8 mm width of a positioning block of the filter brick and of brick legs perpendicular to ground, such that the uniformity of air-water distribution is more than 10% higher than conventional filter brick, the gas distribution uniformity may be increased to up to 96% and the turbidity average is below the specification 10 NTU.

(2) A conductive channel is arranged in the filtering brick body of the present invention, and an ultrasonic conductive medium is arranged in the conductive channel, wherein the state of the conductive medium is a colloid type, which has high sound transmission efficiency, the natural frequency of the conductive medium is close to water, when the ultrasonic generator is connected through an ultrasonic connecting component, an ultrasonic wave with a natural frequency close to that of the ultrasonic conductive medium is emitted, so as to make the ultrasonic conductive medium in each filter brick body resonate which in turn renders the resonance of surrounding water, to loose the impurities by the ultrasonic impact on the filter bed, facilitating the cleaning of the upper filter bed by the flow. Compared with the direct addition of ultrasonic waves to water, the present invention is more directional, which is beneficial to control the ultrasonic direction to be in consistent with the direction of backwash fluid.

(3) The ultrasonic waves are pulsed at intervals by the ultrasonic generator of the present invention, which can effectively prevent a long series of ultrasonic resonance caused by the occurrence of ultrasonic wave in long time which resulting in exceeding the estimated destruction.

(4) The filter brick body of the present invention can adopt two connection modes of parallel and an interlacing type, in which the parallel type connection can rationally utilize the filter pool area, and the interlacing type connection makes the connection of the filter brick body more compact, especially under ultrasonic resonance, such that the overall stability is higher.

(5) The application method of the present invention introduces a modularization concept compared with the existing filter bricks which can effectively combine with the water quality parameters. The quantity of the modulated filter bricks can be determined according to the requirements of the wastewater treatment scale and the influent and effluent quality, such that standardized modular backwash assembly can be provided, which is flexible and efficient.

DETAILED DESCRIPTION OF PREFERRED EMBODIMENTS

Example 1

Figure 1:
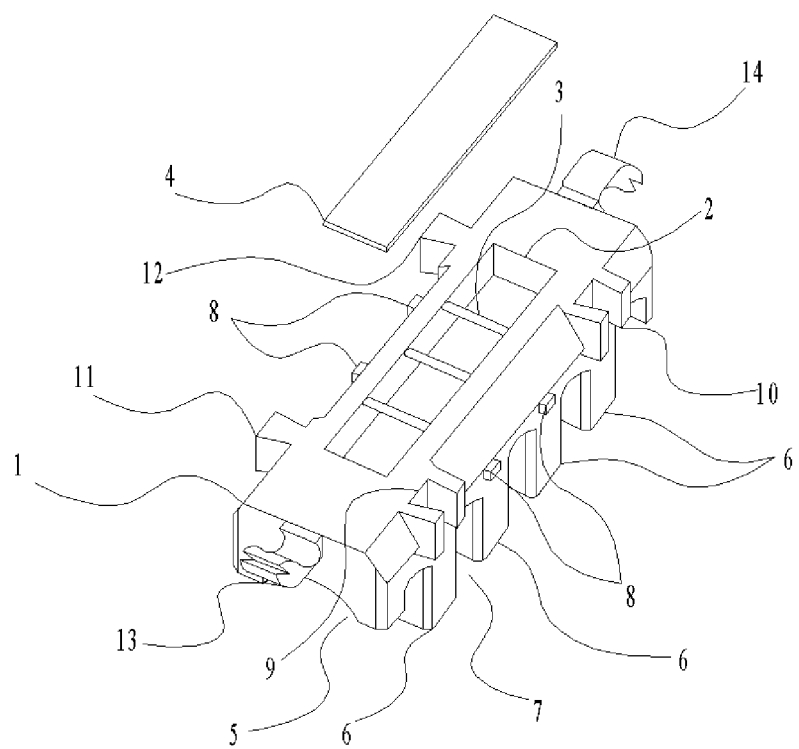
FIG. 1 is an exploded perspective view of a filter brick body according to a first Example of the present invention.
Figure 8:
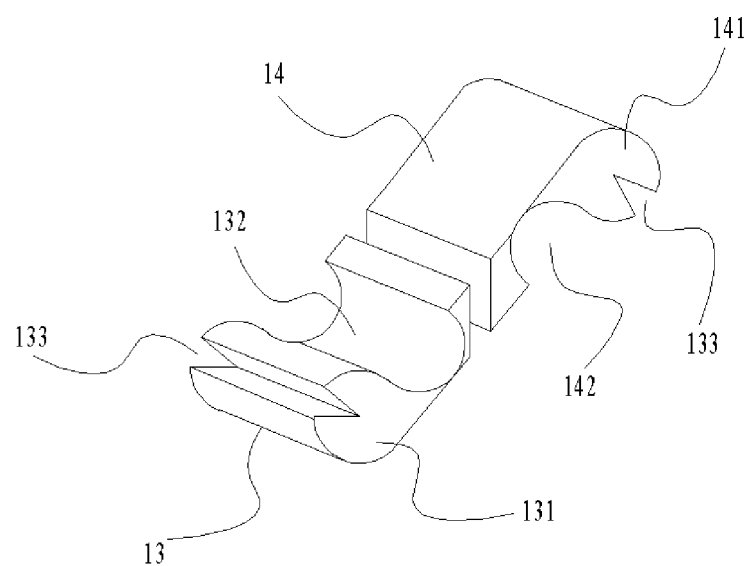
FIG. 8 is a schematic structural view of male and female fasteners according to the first, second, third and fourth embodiments of the present invention.

As shown in FIG. 1, a modular backwash assembly essentially comprises a filter brick body 1 with specifications of: length 554 mm, width 232 mm and height 190 mm. the filter brick body 1 is provided at the center of its upper portion with a square trench 2, which is 494 mm long, 180 mm wide and 50 mm high. The square trench 2 is provided with three stiffeners 3 and fillers (not shown), a mating cover 4 is provided over the square trench 2, the stiffeners 3 are transversely connected at an equal interval to the two long sides of the square trench 2, the fillers is concrete, and the cover 4 is a solid cover. The lower portion of the filter brick body 1 is provided with an inner cavity 5 and four brick legs 6, and the brick legs are designed to be perpendicular to ground so that the uniformity of the air-water distribution is higher than that of the conventional filter brick. The inner cavity 5 penetrates through the filter brick body 1 from left to right, and the brick legs 6 are respectively disposed at an equal interval under the long side of the filter brick body 1. A flow control gap 7 is provided between adjacent brick legs 6, which applies a combined design of a semicircle and a rectangle shape, the diameter of the semicircle of the flow control gap is 40 mm, and the length of the rectangle of the flow control gap is 100 mm, thereby further improving the uniformity of air-water distribution, the brick legs 6 and the flow control gap 7 have same width. A positioning block 8 is provided above the flow control gap 7, which is 8 mm in width, brick legs 6 at two ends are provided with a first slot 9 and a second slot 10 respectively, and a corresponding first chuck 11 and a second chuck 12 are respectively provided at the opposite sides of the first slot 9 and the second slots 10, the first slot 9 and the first chuck 11, and the second slot 10 and the second chuck 12 are configured to connect the longitudinally adjacent filter brick bodies 1 respectively, one short side of the brick body 1 is provided with a male fastener 13 and the other short side is provided with a corresponding female fastener 14, the male fastener 13 and the female fastener 14 are configured to connect the transversely adjacent filter brick bodies 1. As shown in FIG. 8, the male fastener 13 includes a first positive round tenon 131 and a first negative round groove 132, the female fastener 14 includes a positive tenon II 141 and a round negative slot II 142, the first positive round tenon 131 and the second positive round tenon 141 are respectively provided with an expansion slit 133 which is configured to reserving a space to protect the male fastener 13 and the female fastener 14 from being damaged as they were squeezed during vibration. The first positive round tenon 131 and the second negative round groove 142, the first negative round groove 132 and the second positive round tenon 141 are consistent respectively.

The use method of this Example comprises the following steps:

(1) Obtaining the following parameters according to the wastewater treatment scale, influent quality requirements and effluent discharge standards:

In view of a wastewater treatment plant Q: a filter pool with wastewater treatment scale of 20,000 tons/day, A: influent TN 25 mg/L, B: influent TP 1.9 mg/L, S: influent SS 40 mg/L, A1: effluent TN 15 mg/L, B1: effluent TP 0.3 mg/L, S1: effluent SS 10 mg/L, size of filter brick L 0.554 m×W 0.232 m;

(2) Modularizing the block number of the filter brick body by the calculating formula:

$$N = \frac{[(A - A_1) + 0.01(S - S_1)] \times Q}{1098 \times (L \times W)}$$

$$N = Z, N = Z(Z = 1, 2, 3 \ldots)$$
$$N \neq Z, N = \text{INT}(N) + 1$$

Figure 10:
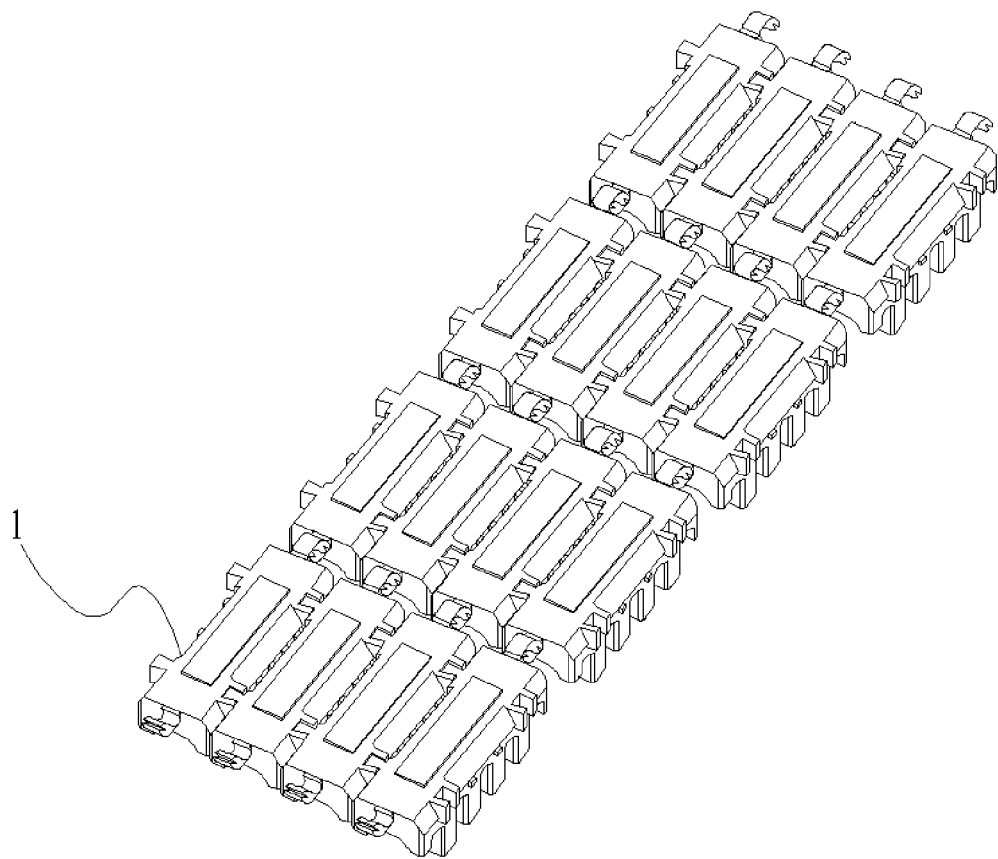
FIG. 10 is a combined schematic view of the parallel type filter brick body according to the first and second embodiments of the present invention.

(3) Calculating the block number of the modularized filter brick body 1 according to step (1) and step (2), to be N=1460;

(4) Filling the square trench of the 1460 filter brick bodies 1 with the fillers and capping the cover 4, and then transversely connecting the male fastener 13 and the female fastener 14 to obtain a transversal filter bricks, then connecting the transversal filter bricks through parallel type connection, that is, the first chuck 11 and the second chuck 12 of the odd-row of the filter brick body 1 are respectively connected to adjacent even-numbered rows of the first slot 9 and the second slot 10 of the filter brick body 1 until the bottom of the filter pool is fully covered, as shown in FIG. 10;

(5) Conducting air distribution uniformity test to check the effect of the air-water distribution of the filter brick and its tightness.

Example 2

Figure 2:
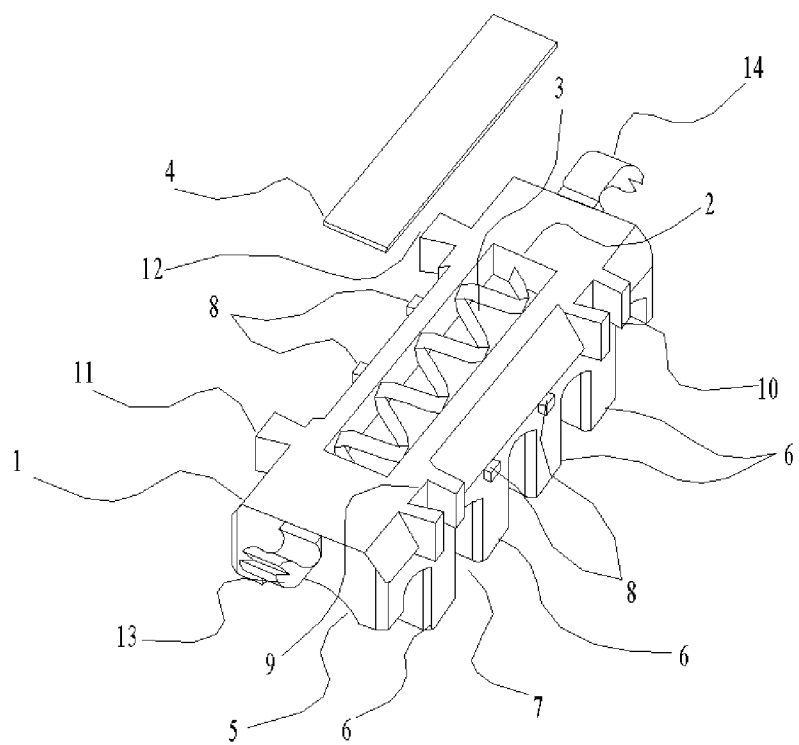
FIG. 2 is an exploded perspective view of the filter brick body according to a second Example of the present invention.
Figure 3:
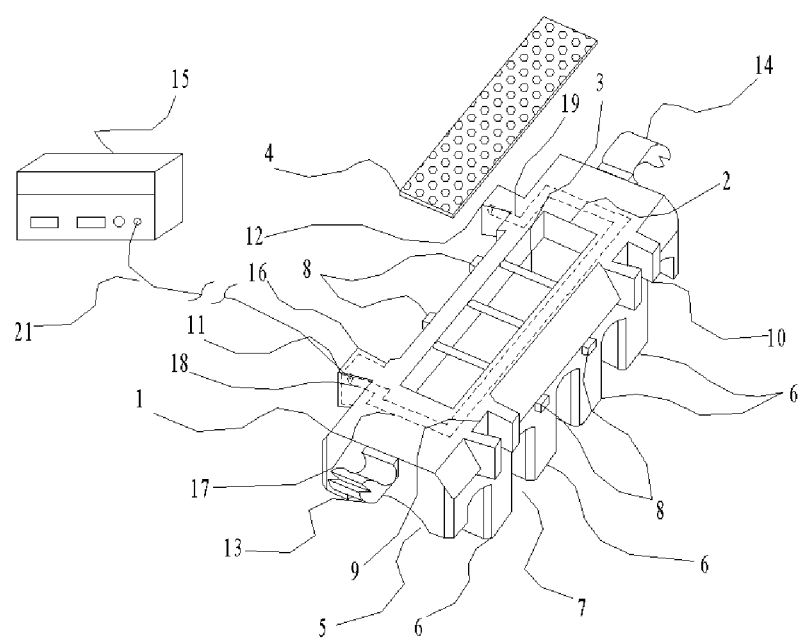
FIG. 3 is an exploded perspective view of the filter brick body according to a third Example of the present invention.
Figure 4:
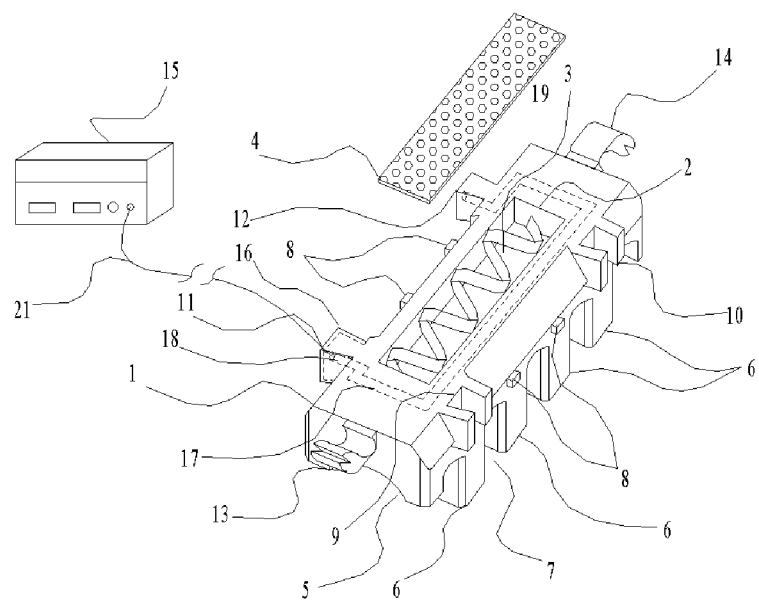
FIG. 4 is an exploded perspective view of a filter brick body according to a fourth Example of the present invention.
Figure 5:
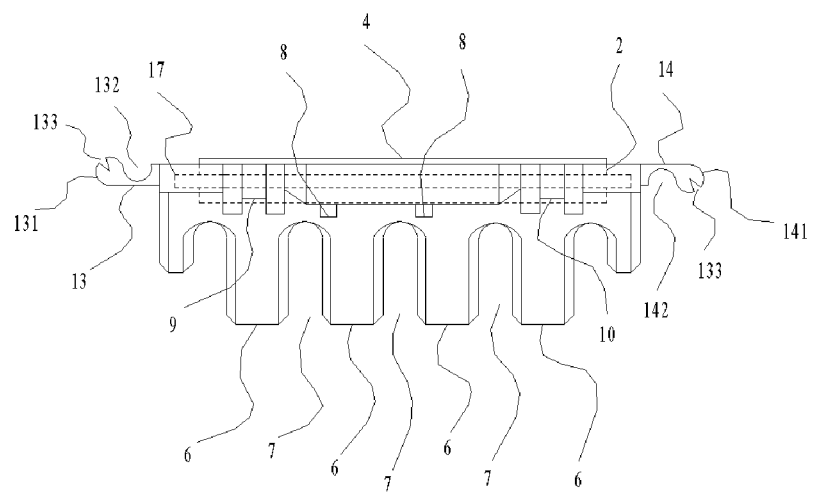
FIG. 5 is a front view of a filter brick body according to the third and fourth embodiments of the present invention.
Figure 6:
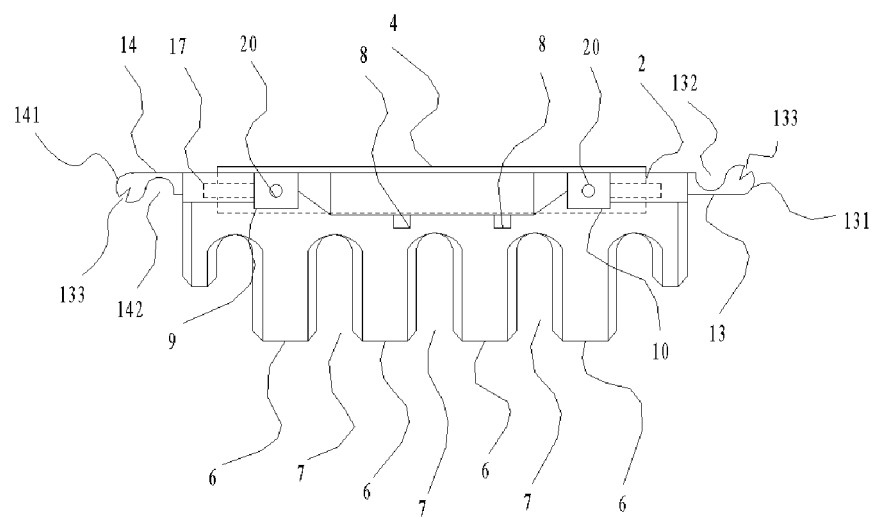
FIG. 6 is a rear view of the filter brick body according to the third and fourth embodiments of the present invention.
Figure 7:
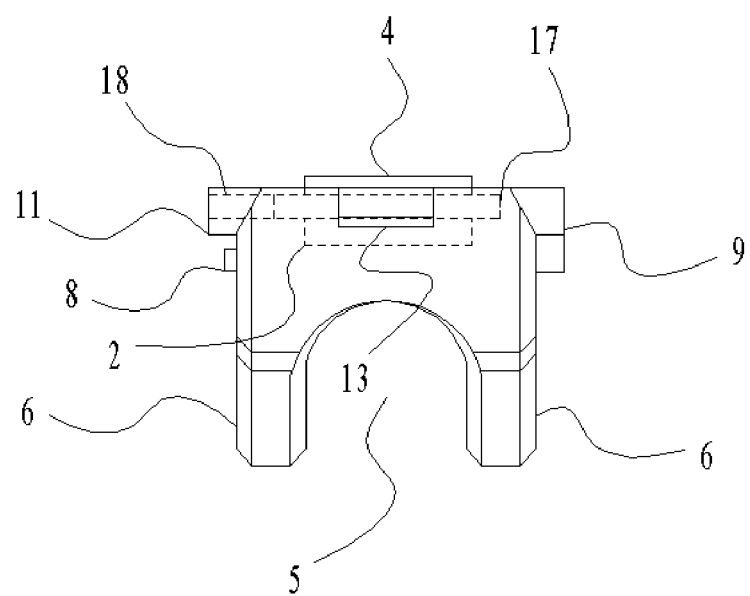
FIG. 7 is a left side view of the filter brick body according to the third and fourth embodiments of the present invention.

As shown in FIG. 2, a modular backwash assembly essentially comprises a filter brick body 1 with specifications of: length 554 mm, width 232 mm and height 190 mm. the filter brick body 1 is provided at the center of its upper portion with a square trench 2, which is 494 mm long, 180 mm wide and 50 mm high. The square trench 2 is provided with a spiral stiffener 3 and fillers (not shown), a mating cover 4 is provided over the square trench 2, the stiffener 3 is connected at the center of the horizontal axis of the square trench 2, the fillers is an adsorbent counterweight package and the cover is a hollow cover. The components of the adsorbent counterweight package by weight include 40% red mud-based porous ceramics, 30% glass beads, 30% sponge iron and the red mud-based porous ceramics can be used for adsorbing heavy metal ions, and the weight of the three kinds of fillers are relatively heavy which can further serve as a counterweight material, to stabilize the structure of the filter brick body 1. The lower portion of the filter brick body 1 is provided with an inner cavity 5 and four brick legs 6, and the brick legs are designed to be perpendicular to ground so that the uniformity of the air-water distribution is higher than that of the conventional filter brick. The inner cavity 5 penetrates through the filter brick body 1 from left to right, and the brick legs 6 are respectively disposed at an equal interval under the long side of the filter brick body 1. A flow control gap 7 is provided between adjacent brick legs 6, which applies a combined design of a semicircle and a rectangle shape, the diameter of the semicircle of the flow control gap is 40 mm, and the length of the rectangle of the flow control gap is 100 mm, thereby further improving the uniformity of air-water distribution, the brick legs 6 and the flow control gap 7 have same width to facilitate the alignment of the flow control gap 7 of each filter brick body 1 during alternating connection, so as to ensure that the flushing speed of the fluid is evenly distributed. A positioning block 8 is provided above the flow control gap 7, which is 8 mm in width, brick legs 6 at two ends are provided with a first slot 9 and a second slot 10 respectively, and a corresponding first chuck 11 and a second chuck 12 are respectively provided at the opposite sides of the first slot 9 and the second slots 10, the first slot 9 and the first chuck 11, and the second slot 10 and the second chuck 12 are configured to connect the longitudinally adjacent filter brick bodies 1 respectively, one short side of the brick body 1 is provided with a male fastener 13 and the other short side is provided with a corresponding female fastener 14, the male fastener 13 and the female fastener 14 are configured to connect the transversely adjacent filter brick bodies 1. As shown in FIG. 8, the male fastener 13 includes a first positive round tenon 131 and a first negative round groove 132, the female fastener 14 includes a positive tenon II 141 and a round negative slot II 142, the first positive round tenon 131 and the second positive round tenon 141 are respectively provided with an expansion slit 133 which is configured to reserving a space to protect the male fastener 13 and the female fastener 14 from being damaged as they were squeezed during vibration. The first positive round tenon 131 and the second negative round groove 142, the first negative round groove 132 and the second positive round tenon 141 are consistent respectively.

The use method of this Example comprises the following steps:

(1) Obtaining the following parameters according to the wastewater treatment scale, influent quality requirements and effluent discharge standards:

In view of a wastewater treatment plant Q: a filter pool with wastewater treatment scale of 30,000 tons/day, influent A: TN 22 mg/L, B: influent TP 1.7 mg/L, S: influent SS 30 mg/L, A1: effluent TN 12 mg/L, B1: effluent TP 0.4 mg/L, S1: effluent SS 9 mg/L, size of filter brick L 0.554 m×W 0.232 m;

(2) Modularizing the block number of the filter brick body by the calculating formula:

$$N = \frac{[(A - A_1) + 0.01(S - S_1)] \times Q}{1098 \times (L \times W)}$$

$$N = Z, N = Z(Z = 1, 2, 3 \ldots )$$

$$N \neq Z, N = \text{INT}(N) + 1$$

Figure 11:
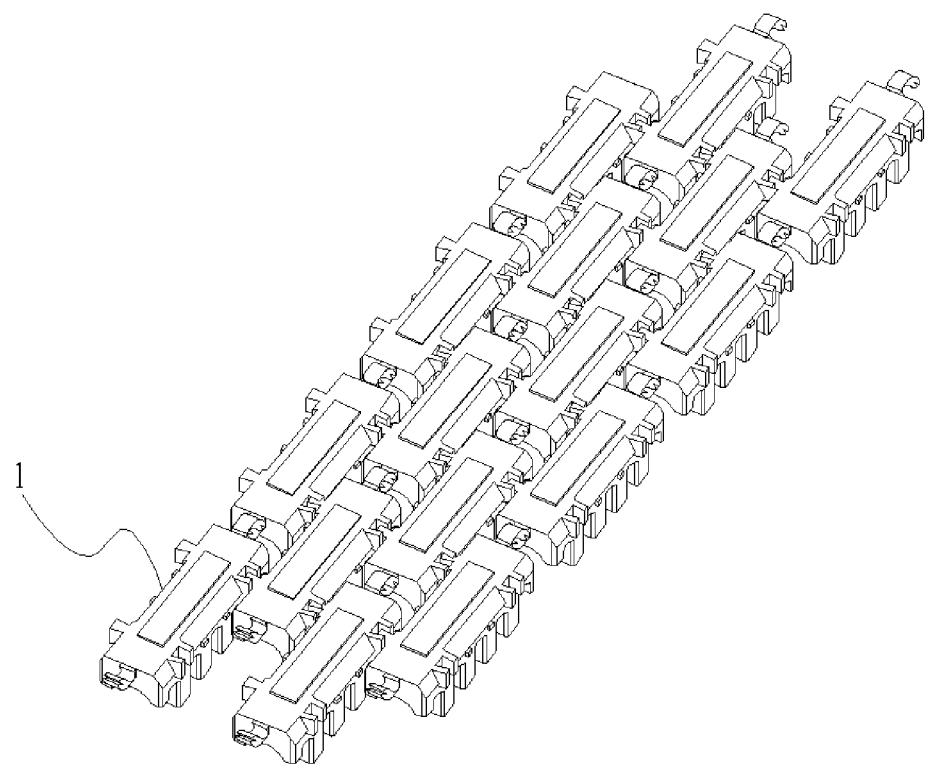
FIG. 11 is a combined schematic view of the interleaved type filter brick body according to the first and second embodiments of the present invention.

(3) Calculating the block number of the modularized filter brick body 1 according to step (1) and step (2), to be N=2171;

(4) Filling the square trench of the 2171 filter brick bodies 1 with the fillers and capping the cover 4, and then transversely connecting the male fastener 13 and the female fastener 14 to obtain a transversal filter bricks, then connecting the transversal filter bricks through interlacing type connection, that is, the first chuck 11 and the second chuck 12 of the odd-row of the filter brick body 1 are respectively interlaced connected to adjacent even-numbered rows of the second slot 10 and the first slot 9 of the filter brick body 1 until the bottom of the filter pool is fully covered, as shown in FIG. 11;

(5) Conducting air distribution uniformity test to check the effect of the air-water distribution of the filter brick and its tightness.

Example 3

As shown in FIGS. 3, 5, 6, 7, a modular backwash assembly essentially comprises a filter brick body 1 with specifications of: length 554 mm, width 232 mm and height 190 mm, an ultrasonic generator 15 and an ultrasonic connecting component 16. the filter brick body 1 is provided at the center of its upper portion with a square trench 2, which is 494 mm long, 180 mm wide and 50 mm high. The square trench 2 is provided with three stiffeners 3 and fillers (not shown), a mating cover 4 is provided over the square trench 2. The square trench 2 is provided on the periphery of the "U-like" shaped conductive channel 17, the conductive channel 17 is built in the upper portion of the filter brick body 1, and the interior is provided with an ultrasonic conductive medium with a filling rate of 50%, wherein the composition of the ultrasonic conductive medium comprises the following components in percentage by weight: 15% nanosilica sol, 15% nanocellulose gel, 5% polyacrylamide gel, 3% sodium alginate gel, 4% agarose gel, 2% propylene dextran gel, 0.05% pH adjusting agent, 0.1% moisturizer, 0.01% bactericidal preservative with the balance being deionized water. The gel-type conductive medium has high sound transmission efficiency, and is more stable. The ultrasonic conductive medium is in the form of a gel, with natural frequency of 26 MHZ, when filling rate is too high, the vibration amplitude in the resonance process may be too large, thus making the filter brick body 1 to vibrate drastically, which is adverse to the stability of the filter brick body 1. The natural frequency of the ultrasonic conductive medium is similar to that of the water. When the ultrasonic generator 15 is connected by the ultrasonic connecting component 16, an ultrasonic wave with a natural frequency close to that of the ultrasonic conductive medium is emitted, so as to make the ultrasonic conductive medium resonate in each filter brick body which in turn renders the resonance of surrounding water to achieve the effect of cleaning the filter bed by ultrasonic vibration. The lower portion of the filter brick body 1 is provided with an inner cavity 5 and four brick legs 6, and the brick legs are designed to be perpendicular to ground so that the uniformity of the air-water distribution is higher than that of the conventional filter brick. The inner cavity 5 penetrates through the filter brick body 1 from left to right, and the brick legs 6 are respectively disposed at an equal interval under the long side of the filter brick body 1. A flow control gap 7 is provided between adjacent brick legs 6, which applies a combined design of a semicircle and a rectangle shape, the diameter of the semicircle of the flow control gap is 40 mm, and the length of the rectangle of the flow control gap is 100 mm, thereby further improving the uniformity of air-water distribution, the brick legs 6 and the flow control gap 7 have same width to facilitate the alignment of the flow control gap 7 of each filter brick body 1 during alternating connection, so as to ensure that the flushing speed of the fluid is evenly distributed. A positioning block 8 is provided above the flow control gap 7, which is 8 mm in width, brick legs 6 at two ends are provided with a first slot 9 and a second slot 10 respectively, and a corresponding first chuck 11 and a second chuck 12 are respectively provided at the opposite sides of the first slot 9 and the second slots 10, the first slot 9 and the first chuck 11, and the second slot 10 and the second chuck 12 are configured to connect the longitudinally adjacent filter brick bodies 1 respectively. The first chuck 11 and the second chuck 12 are respectively provided with a first infusion channel 18 and a second infusion channel 19. One end of the first infusion channel 18 and the second infusion channel 19 are respectively communicated with the conductive channel 17, and the other end penetrates the first chuck 11 and the second chuck 12 respectively, and is sealed by the blocker 20. One short side of the brick body 1 is provided with a male fastener 13 and the other short side is provided with a corresponding female fastener 14.

Figure 9:
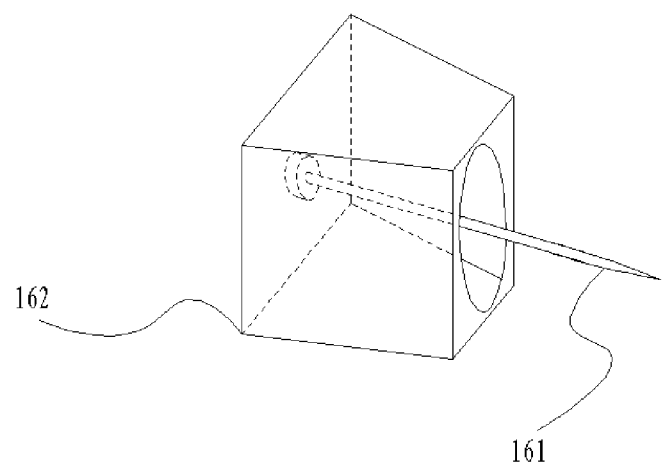
FIG. 9 is a schematic structural view of an ultrasonic connecting component according to the third and fourth embodiments of the present invention.

As shown in FIG. 8, the male fastener 13 includes a first positive round tenon 131 and a first negative round groove 132, the female fastener 14 includes a positive tenon II 141 and a round negative slot 11142, the first positive round tenon 131 and the second positive round tenon 141 are respectively provided with an expansion slit 133 which is configured to reserving a space to protect the male fastener 13 and the female fastener 14 from being damaged as they were squeezed during vibration. The first positive round tenon 131 and the second negative round groove 142, the first negative round groove 132 and the second positive round tenon 141 are consistent respectively. The transversely adjacent filter brick bodies 1 are connected by the male fastener 13 and the female fastener 14; as shown in FIG. 9, the ultrasonic connecting component 16 comprises a piercing probe 161 and a sealing sleeve 162. The distal end of the piercing probe 161 is located in the first infusion channel 18 or the second infusion channel 19 and is in contact with the ultrasonic conductive medium. The proximal end of the piercing probe 161 is connected with the ultrasonic generator 15 through a waterproof wire 21, the sealing sleeve 162 is wrapped around the first chuck 11 or the second chuck 12.

The use method of this Example comprises the following steps:

(1) Obtaining the following parameters according to the wastewater treatment scale, influent quality requirements and effluent discharge standards:

In view of a wastewater treatment plant Q: a filter pool with wastewater treatment scale of 50,000 tons/day, A: influent TN 20 mg/L, B: influent TP 1.5 mg/L, S: influent SS 35 mg/L, A1: effluent TN 13 mg/L, B1: effluent TP 0.5 mg/L, S1: effluent SS 8 mg/L, size of filter brick L 0.554 m×W 0.232 m;

(2) Modularizing the block number of the filter brick body by the calculating formula:

$$N = \frac{[(A - A_1) + 0.01(S - S_1)] \times Q}{1098 \times (L \times W)}$$

$$N = Z, N = Z(Z = 1, 2, 3 \ldots)$$

$$N \neq Z, N = INT(N) + 1$$

Figure 12:
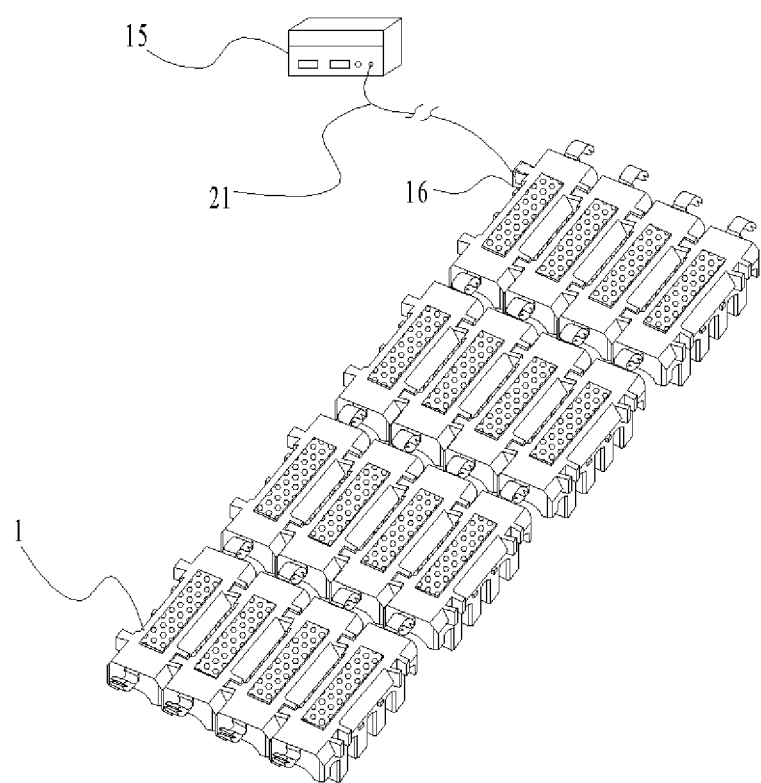
FIG. 12 is a combined schematic view of the parallel type filter brick body according to the third and fourth embodiments of the present invention.

(3) Calculating the block number of the modularized filter brick body 1 according to step (1) and step (2), to be N=2576;

(4) Filling the square trench of the 2576 filter brick bodies 1 with concrete and capping the cover 4, and then transversely connecting the male fastener 13 and the female fastener 14 to obtain a transversal filter bricks, then connecting the transversal filter bricks through parallel type connection, that is, the first chuck 11 and the second chuck 12 of the odd-row of the filter brick body 1 are respectively connected to adjacent even-numbered rows of the first slot 9 and the second slot 10 of the filter brick body 1 until the bottom of the filter pool is fully covered, as shown in FIG. 12; In addition, the ultrasonic generator 15 is connected to any one of the filter brick bodies 1, the ultrasonic frequency of the ultrasonic generator 15 is 26 MHz, the single occurrence time is 30 s and the time interval is 3 min. The ultrasonic waves are pulsed at intervals to prevent the destructiveness from exceeding the estimate caused by a series of resonance resulting from ultrasonic waves for a long time.

(5) Conducting air distribution uniformity test to check the effect of the air-water distribution of the filter brick and its tightness.

Example 4

As shown in FIGS. 4, 5, 6, 7, a modular backwash assembly essentially comprises a filter brick body 1 with specifications of: length 554 mm, width 232 mm and height 190 mm, an ultrasonic generator 15 and an ultrasonic connecting component 16. the filter brick body 1 is provided at the center of its upper portion with a square trench 2, which is 494 mm long, 180 mm wide and 50 mm high. The square trench 2 is provided with a spiral stiffener 3 and fillers (not shown), a mating cover 4 is provided over the square trench 2, the fillers is an adsorbent counterweight package and the cover is a hollow cover. The components of the adsorbent counterweight package by weight include 40% red mud-based porous ceramics, 30% glass beads, 30% sponge iron and the red mud-based porous ceramics can be used for adsorbing heavy metal ions, and the weight of the three kinds of fillers are relatively heavy which can further serve as a counterweight material, to stabilize the structure of the filter brick body 1. The square trench 2 is provided on the periphery of the "U-like" shaped conductive channel 17, the conductive channel 17 is built in the upper portion of the filter brick body 1, and the interior is provided with an ultrasonic conductive medium with a filling rate of 70%, wherein the composition of the ultrasonic conductive medium comprises the following components in percentage by weight: 20% nanosilica sol, 17% nanocellulose gel, 10% polyacrylamide gel, 5% sodium alginate gel, 5% agarose gel, 3% propylene dextran gel, 0.15% pH adjusting agent, 0.6% moisturizer, 0.07% bactericidal preservative with the balance being deionized water. The gel-type conductive medium has high sound transmission efficiency, and is more stable.

Wherein, the ultrasonic conductive medium is in the form of a gel, with natural frequency of 27 MHZ, when filling rate is too high, the vibration amplitude in the resonance process may be too large, thus making the filter brick body 1 to vibrate drastically, which is adverse to the stability of the filter brick body 1. The natural frequency of the ultrasonic conductive medium is similar to that of the water. When the ultrasonic generator 15 is connected by the ultrasonic connecting component 16, an ultrasonic wave with a natural frequency close to that of the ultrasonic conductive medium is emitted, so as to make the ultrasonic conductive medium resonate in each filter brick body which in turn renders the resonance of surrounding water to achieve the effect of cleaning the filter bed by ultrasonic vibration. The lower portion of the filter brick body 1 is provided with an inner cavity 5 and four brick legs 6, and the brick legs are designed to be perpendicular to ground so that the uniformity of the air-water distribution is higher than that of the conventional filter brick. The inner cavity 5 penetrates through the filter brick body 1 from left to right, and the brick legs 6 are respectively disposed at an equal interval under the long side of the filter brick body 1. A flow control gap 7 is provided between adjacent brick legs 6, which applies a combined design of a semicircle and a rectangle shape, the diameter of the semicircle of the flow control gap is 40 mm, and the length of the rectangle of the flow control gap is 100 mm, thereby further improving the uniformity of air-water distribution, the brick legs 6 and the flow control gap 7 have same width to facilitate the alignment of the flow control gap 7 of each filter brick body 1 during alternating connection, so as to ensure that the flushing speed of the fluid is evenly distributed. A positioning block 8 is provided above the flow control gap 7, which is 8 mm in width, brick legs 6 at two ends are provided with a first slot 9 and a second slot 10 respectively, and a corresponding first chuck 11 and a second chuck 12 are respectively provided at the opposite sides of the first slot 9 and the second slots 10, the first slot 9 and the first chuck 11, and the second slot 10 and the second chuck 12 are configured to connect the longitudinally adjacent filter brick bodies 1 respectively. The first chuck 11 and the second chuck 12 are respectively provided with a first infusion channel 18 and a second infusion channel 19. One end of the first infusion channel 18 and the second infusion channel 19 are respectively communicated with the conductive channel 17, and the other end penetrates the first chuck 11 and the second chuck 12 respectively, and is sealed by the blocker 20. One short side of the brick body 1 is provided with a male fastener 13 and the other short side is provided with a corresponding female fastener 14.

As shown in FIG. 8, the male fastener 13 includes a first positive round tenon 131 and a first negative round groove 132, the female fastener 14 includes a positive tenon II 141 and a round negative slot II 142, the first positive round tenon 131 and the second positive round tenon 141 are respectively provided with an expansion slit 133 which is configured to reserving a space to protect the male fastener 13 and the female fastener 14 from being damaged as they were squeezed during vibration. The first positive round tenon 131 and the second negative round groove 142, the first negative round groove 132 and the second positive round tenon 141 are consistent respectively. The transversely adjacent filter brick bodies 1 are connected by the male fastener 13 and the female fastener 14; as shown in FIG. 9, the ultrasonic connecting component 16 comprises a piercing probe 161 and a sealing sleeve 162. The distal end of the piercing probe 161 is located in the first infusion channel 18 or the second infusion channel 19 and is in contact with the ultrasonic conductive medium. The proximal end of the piercing probe 161 is connected with the ultrasonic generator 15 through a waterproof wire 21, the sealing sleeve 162 is wrapped around the first chuck 11 or the second chuck 12.

The use method of this Example comprises the following steps:

(1) Obtaining the following parameters according to the wastewater treatment scale, influent quality requirements and effluent discharge standards:

In view of a wastewater treatment plant Q: a filter pool with wastewater treatment scale of 100,000 tons/day, A: influent TN 18 mg/L, B: influent TP 1.3 mg/L, S: influent SS 33 mg/L, A1: effluent TN 8 mg/L, B1: effluent TP 0.4 mg/L, S1: effluent SS 9 mg/L, size of filter brick L 0.554 m×W 0.232 m;

(2) Modularizing the block number of the filter brick body by the calculating formula:

$$N = \frac{[(A - A_1) + 0.01(S - S_1)] \times Q}{1098 \times (L \times W)}$$

$$N = Z, N = Z(Z = 1, 2, 3 \ldots)$$

$$N \neq Z, N = \text{INT}(N) + 1$$

Figure 13:
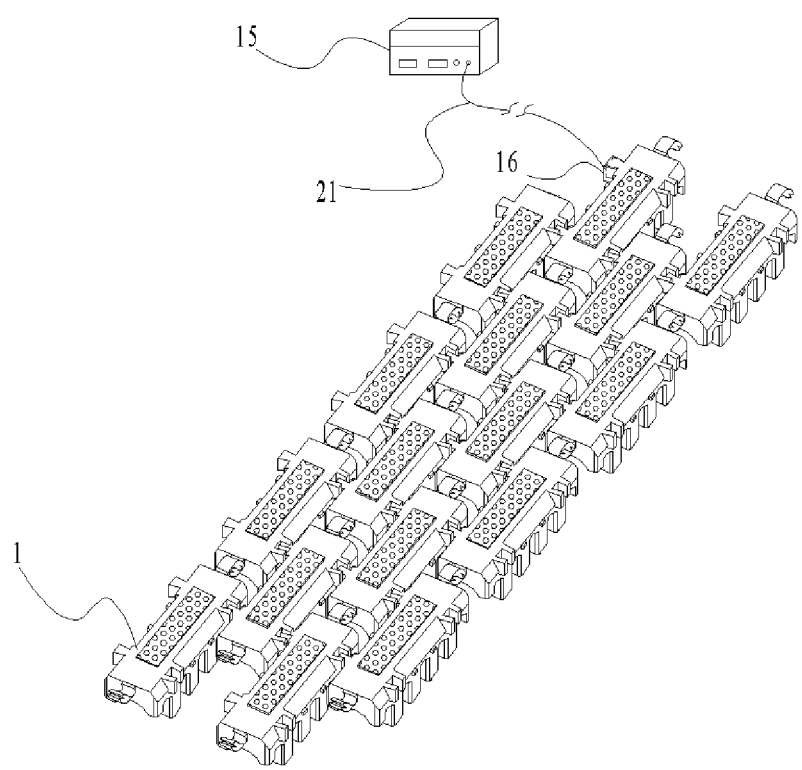
FIG. 13 is a combined schematic view of the interleaved type filter brick body according to the third and fourth embodiments of the present invention.

(3) Calculating the block number of the modularized filter brick body 1 according to step (1) and step (2), to be N=7257;

(4) Filling the square trench of the 7257 filter brick bodies 1 with concrete and capping the cover 4, and then transversely connecting the male fastener 13 and the female fastener 14 to obtain a transversal filter bricks, then connecting the transversal filter bricks through parallel type connection, that is, the first chuck 11 and the second chuck 12 of the odd-row of the filter brick body 1 are respectively interlaced connected to adjacent even-numbered rows of the second slot 10 and the first slot 9 of the filter brick body 1 until the bottom of the filter pool is fully covered, as shown in FIG. 13; In addition, the ultrasonic generator 15 is connected to any one of the filter brick bodies 1, the ultrasonic frequency of the ultrasonic generator 15 is 27 MHz, the single occurrence time is 60 sec and the time interval is 4 min. The ultrasonic waves are pulsed at intervals to prevent the destructiveness from exceeding the estimate caused by a series of resonance resulting from ultrasonic waves for a long time.

(5) Conducting air distribution uniformity test to check the effect of the air-water distribution of the filter brick and its tightness.

Example 5

Figure 14:
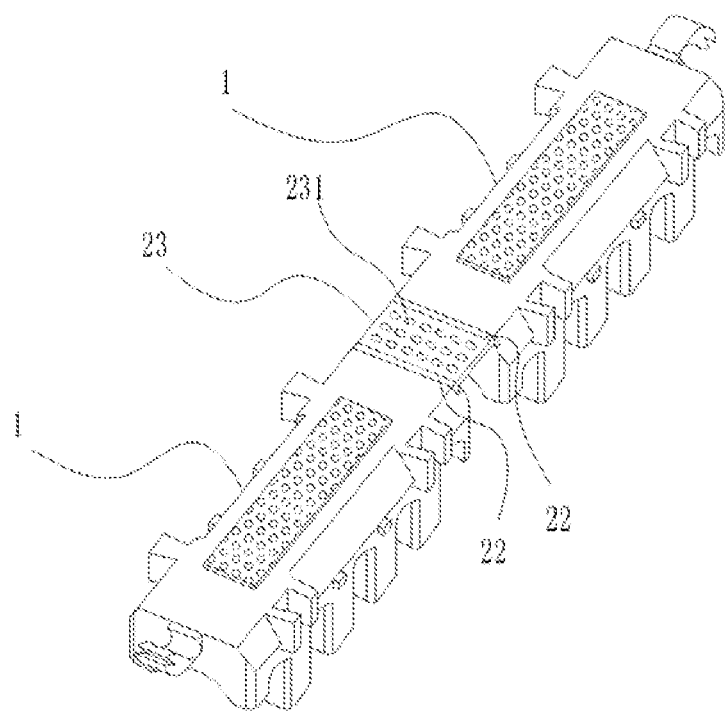
FIG. 14 is a schematic view of the connection between two adjacent filter brick bodies and a cover according to the third Example of the present invention.

This example is basically the same as example 3 except that:

As an improvement, as shown in FIG. 14, grooves 22 are respectively disposed on the left and right ends of the upper surface of the filter brick body 1, the grooves 22 are respectively parallel to the male fastener 13 and the female fastener 14, and the transversely adjacent grooves 22 are configured to be connected through a cover plate 23. The cover plate 23 is further provided with circular holes 231 arranged in a matrix. By the male fastener and the female fastener, not only strengthen the stability among the filter brick bodies 1, but also make up for the defects caused by increased gap and reduce the air and water resistance, which is beneficial to the air-water distribution.

Gas Distribution Test (I) Test Grouping

The test was divided into 10 groups, 5 experimental groups and 5 control groups. The 5 experimental groups were set up according to Examples 1-5 of the present invention. The 5 control groups apply filter brick (model: KS-008) available from Hunan Kesheng Water Co., Ltd. The distinguishing features of the filter bricks of the experimental group 1-5 and the control groups 1-5 are shown in Table 1, and the remaining conditions were set in correspondence with the experimental groups.

TABLE 1

Distinguishing features of filter bricks of experimental groups 1-5 and control groups 1-5

| Group | Shape of flow control gap | Amount of connector | Connecting direction of adjacent bricks | Whether stiffeners | Ultrasonic connectable |
|---|---|---|---|---|---|
| experimental group 1 | round and rectangle | 3 | transversely and longitudinally | Yes | No |
| control group 1 | Isosceles trapezoid | 2 | transversely or longitudinally | No | No |
| experimental | round and | 3 | transversely | Yes | No |
| control group | Isosceles | 2 | transversely or | No | No |
| experimental | round and | 3 | transversely | Yes | Yes |
| control group | Isosceles | 2 | transversely or | No | No |
| experimental | round and | 3 | transversely | Yes | Yes |

TABLE 1-continued

Distinguishing features of filter bricks of experimental groups 1-5 and control groups 1-5

| Group | Shape of flow control gap | Amount of connector | Connecting direction of adjacent bricks | Whether stiffeners | Ultrasonic connectable |
|---|---|---|---|---|---|
| control group | Isosceles | 2 | transversely or | No | No |
| experimental | round and | 3 | transversely | Yes | Yes |
| control group | Isosceles | 2 | transversely or | No | No |

(II) Test Conditions

The experimental conditions for experimental groups 1-5 and control groups 1-5 are shown in Table 2.

TABLE 2

Experimental conditions for experimental groups 1-5 and control groups 1-5

| Group experimental | Income condition (mg/L) | | | Contamination time (day) | Rinse intensity (L/(s·m²)) | Ultrasonic frequency (MHZ) | backwash time (min) |
|---|---|---|---|---|---|---|---|
| group I | TN | TP | SS | | | | |
| control | 25 | 1.9 | 40 | 30 | 12 | — | 10 |
| experime | | | | | | | |
| control | 22 | 1.7 | 30 | 30 | 15 | — | 10 |
| experime | | | | | | | |
| control | 20 | 1.5 | 35 | 30 | 10 | 26 | 10 |
| experime | | | | | | | |
| control | 18 | 1.3 | 33 | 30 | 9 | 27 | 10 |
| experime | | | | | | | |
| control | 20 | 1.5 | 35 | 30 | 8 | 26 | 10 |

(III) Test Apparatus

High-definition camera; processor containing Nikon image analysis software NIS-Elements; pump; sewage pump; ultrasonic generator; blower; turbidity detector.

(IV) Test Methods

In the first step, the filter bricks from the experimental groups and the control groups are first laid in the corresponding filter pools as required, and the filter pools containing the experimental groups and the control groups are subjected to pollution treatment according to the conditions of step (2).

In the second step, after discharging the sewage using the sewage pump, clean water are pumped through the water pump and inject into each filter pool, respectively, until the water surface is 10 cm above the upper surface of the filter brick, and high-definition camera is set up 3 m directly above the filter pool, and the filter pools containing the experimental groups and the control groups are again subject to gas flushing using a blower with different flushing strengths, follow the condition of steps (2), or to gas flushing using a blower with different flushing strengths in company with an ultrasonic assisted flushing of corresponding frequency, and stop after 10 min; During the process, the HD camera captured the water surface at a frequency of 10 seconds and transmitted the images to the background. The homogeneity of the bubbles was analyzed by a processor containing Nikon image analysis software NIS-Elements, and the average value was finally calculated. The results are shown in Table 3;

In the third step, the sewage after backwash treatment is pumped out by the sewage pump, and then fresh water are pumped using the pump and injected into each filter, respectively, until the water surface is 10 cm above the top surface of the filter brick, and the experimental group and the control group are subject to backwash test using the blower with 17 L/(s·m2) flushing strength respectively. After 1 min, the turbidity of the filter water containing the experimental group and the control group was measured 10 times using a turbidity detector and average is calculated (using the specification of 10 NTU as the evaluation standard), the test results are shown in Table 3;

TABLE 3

Backwash detection results for experimental groups 1-5 and control groups 1-5

| Group | Average distribution | Turbidity average |
|---|---|---|
| experimen | 91 | 8.7 |
| control | 73 | 19.3 |
| experimen | 90 | 7.5 |
| control | 78 | 17.9 |
| experimen | 93 | 4.1 |
| control | 53 | 14.6 |
| experimen | 95 | 3.9 |
| control | 57 | 13.5 |
| experimen | 96 | 2.5 |
| control | 54 | 15.2 |

It can be seen from Table 2 that the uniformity of the gas distribution of the experimental groups 1-5 of the present invention is all over 90% and the highest is up to 96%, while in the control group 1-2 without ultrasonic assistance, the highest uniformity of the gas distribution is 78%, and in the control group 3-5 with ultrasonic assistance, since the control group uses conventional filter bricks, the structure therebetween is loose, and the filter brick itself is not conducive to the uniform transmission of the ultrasonic wave, resulting in a significant decrease in the uniformity of the gas distribution. However, ultrasound can play a role in the deep cleaning of the interior of the filter brick. Therefore, the average turbidity of the control groups 3-5 is lower than that of the control groups 1-2. In addition, the turbidity averages of examples 1-5 of the present invention are all under the specification standard of 10 NTU, while in the control group under the same conditions, the turbidity averages are not under the specification standard of 10 NTU, and therefore need to extend the backwashing time so as to achieve a better backwashing effect, which in turn will increase the energy consumption of the apparatus. In contrast, the present invention achieves excellent results in a shorter time, ie, lower energy consumption.

It should be noted that those skilled in the art should understand that, in light of the present inventive concept and the specific embodiments, any variations that may be directly derived from or related to the disclosure and common sense of the present disclosure will be realized by those skilled in the art. It is also recognized to those skilled in the art that other methods may be used, or the substitution of common well-known techniques in the prior art, as well as the insubstantial changes in the different combinations of the features and the like, may also be applied to achieve the functions and effects described in the present invention, all of which will not be exemplified in details as they fall into the protection scope of the present invention.

We claim:

1. A modular backwash assembly, comprising:
a filter brick body (1) of a cuboid structure, a square trench (2) provided at the center of an upper portion of the filter brick body (1) and is provided with a plurality of stiffeners (3) and fillers, a mating cover (4) provided over the square trench (2), an inner cavity (5) and brick legs (6) provided at a lower portion of the filter brick body (1), the inner cavity (5) penetrates through the filter brick body (1) and the brick legs (6) are respectively disposed at an equal interval under the long sides of the filter brick body (1), wherein the fillers are either concrete or an adsorbent counterweight package, wherein the cover (4) is a solid cover when the fillers is concrete, and wherein the cover (4) is a hollow cover when the fillers is an adsorbent counterweight package, a flow control gap (7) provided between the brick legs (6) and having the same width as the brick legs (6), a positioning block (8) provided above the flow control gap (7), a first slot (9) and a second slot (10) respectively provided at the brick legs (6) at two ends, and a corresponding first chuck (11) and a second chuck (12) respectively provided at the opposite sides of the first slot (9) and the second slot (10), a male fastener (13) provided at one short side of the filter brick body (1) and a corresponding female fastener (14) provided at the other short side, the male fastener (13) and the female fastener (14) are configured to connect transversely adjacent filter brick bodies, wherein the male fastener (13) comprises a first positive round tenon (131) and a first negative round groove (132), the female fastener (14) comprises a second positive round tenon (141) and a second negative round groove (142), the first positive round tenon (131) and the second positive round tenon (141) are respectively provided with an expansion slit (133), the first positive round tenon (131) and the second negative round groove (142), the first negative round groove (132) and the second positive round tenon (141) match each other respectively.

2. A modular backwash assembly, comprising: a filter brick body (1) of a cuboid structure, an ultrasonic generator (15) and an ultrasonic connecting component (16), a square trench (2) provided at the center of an upper portion of the filter brick body (1) and is provided with a plurality of stiffeners (3) and fillers, a mating cover (4) provided over the square trench (2), a conductive channel (17) provided on the periphery of the square trench (2) and is "U" shaped, the conductive channel (17) being built in the upper portion of the filter brick body (1), and is provided with an ultrasonic conductive medium therein, an inner cavity (5) and brick legs (6) provided at a lower portion of the filter brick body (1), the inner cavity (5) penetrating through the filter brick body (1) and the brick legs (6) being respectively disposed at an equal interval under the long sides of the filter brick body (1), a flow control gap (7) provided between the brick legs (6) wherein the flow control gap and the brick legs have the same width, a positioning block (8) provided above the flow control gap (7), a first slot (9) and a second slot (10) respectively provided at the brick legs (6) at two ends, and a corresponding first chuck (11) and a second chuck (12) respectively provided at the opposite sides of the first slot (9) and the second slot (10), the first chuck (11) and the second chuck (12) are respectively provided with a first infusion channel (18) and a second infusion channel (19), one end of the first infusion channel (18) and the second infusion channel (19) respectively communicates with the conductive channel (17), and the other end of the first infusion channel (18) and the second infusion channel (19) penetrates the first chuck (11) and the second chuck (12) respectively, and is sealed by a blocker (20), a male fastener (13) provided at one short side of the filter brick body (1) and a corresponding female fastener (14) provided at the other short side, the male fastener (13) and the female fastener (14) are configured to connect transversely adjacent filter brick bodies, the ultrasonic connecting component (16) comprises a piercing probe (161) and a sealing sleeve (162), the distal end of the piercing probe (161) is located in the first infusion channel (18) or the second infusion channel (19) and is in contact with the ultrasonic conductive medium, the proximal end of the piercing probe (161) is connected with the ultrasonic generator (15) through a waterproof wire (21), the sealing sleeve (162) is wrapped around the first chuck (11) or the second chuck (12).

3. The modular backwash assembly according to claim 2, wherein the fillers are either concrete or an adsorbent counterweight package, wherein the cover (4) is a solid cover when the fillers is concrete, and wherein the cover (4) is a hollow cover when the fillers is an adsorbent counterweight package.

4. The modular backwash assembly according to claim 2, wherein the male fastener (13) comprises a first positive round tenon (131) and a first negative round groove (132), the female fastener (14) comprises a second positive round tenon (141) and a second negative round groove (142), the first positive round tenon (131) and the second positive round tenon (141) are respectively provided with an expansion slit (133), the first positive round tenon (131) and the second negative round groove (142), the first negative round groove (132) and the second positive round tenon (141) match each other respectively.

* * * * *